(12) United States Patent
Fee et al.

(10) Patent No.: US 8,183,723 B2
(45) Date of Patent: May 22, 2012

(54) COOLING JACKET AND STATOR ASSEMBLY FOR ROTARY ELECTRIC DEVICE

(75) Inventors: David Fee, Groveland, IL (US); Jonathan Baumann, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 463 days.

(21) Appl. No.: 12/319,830

(22) Filed: Jan. 13, 2009

(65) Prior Publication Data
US 2009/0127946 A1 May 21, 2009

Related U.S. Application Data

(63) Continuation-in-part of application No. 11/825,038, filed on Jul. 3, 2007, now Pat. No. 7,626,292.

(51) Int. Cl.
*H02K 9/19* (2006.01)
*H02K 5/20* (2006.01)

(52) U.S. Cl. .............. 310/54; 310/64; 310/89; 165/156
(58) Field of Classification Search .............. 310/54, 310/64, 89; 165/156
See application file for complete search history.

(56) References Cited

U.S. PATENT DOCUMENTS

| | | | |
|---|---|---|---|
| 1,710,648 A * | 4/1929 | Thompson | 165/156 |
| 3,531,668 A | 9/1970 | Cathey | |
| 3,577,024 A | 5/1971 | Inagaki et al. | |
| 4,516,044 A * | 5/1985 | Bone | 310/64 |
| 5,220,233 A * | 6/1993 | Birch et al. | 310/156.28 |
| 5,363,002 A | 11/1994 | Hernden et al. | |
| 6,300,693 B1 | 10/2001 | Poag et al. | |
| 6,633,097 B2 * | 10/2003 | Dunlap et al. | 310/54 |
| 7,009,317 B2 | 3/2006 | Cronin et al. | |
| 7,322,103 B2 | 1/2008 | Burjes et al. | |
| 7,626,292 B2 * | 12/2009 | Baumann et al. | 310/54 |

* cited by examiner

Primary Examiner — Burton Mullins
(74) Attorney, Agent, or Firm — Liell & McNeil (57) ABSTRACT

An electric motor/generator cooling mechanism is presented. The cooling mechanism includes a hollow cooling jacket having an inner and outer coaxial surface, where the inner surface defines a generally cylindric cavity for receiving a stator in heat transference contact with the inner surface, and the outer surface has a cast spiral groove section with jogged cooling passages. The disclosure includes an outer case having one or more inlet ports, an outlet port, and a vent for purging air, cooling fluid flowingly encased between the cooling jacket and the outer case, flowing through the jogged cooling passages, and a flanged end surface on an end of the outer case for boltingly connecting the cooling jacket to the outer case.

15 Claims, 8 Drawing Sheets

COOLING JACKET AND STATOR ASSEMBLY FOR ROTARY ELECTRIC DEVICE

This patent application is a continuation-in-part of U.S. patent application Ser. No. 11/825,038, filed Jul. 3, 2007 now U.S. Pat. No. 7,626,292.

TECHNICAL FIELD

The present disclosure relates generally to cooling systems and strategies for rotary electric devices such as motors and generators, and relates more particularly to a cooling jacket for such a device having circumferential and axially advancing cooling fluid grooves formed in an outer surface thereof.

BACKGROUND

Cooling jackets provide an excellent means for cooling electric motors and generators, such as brushless permanent magnet generators operating at high speeds and driven by fuel-powered engines to generate electrical power. Electric motors and generators generate considerable heat and require an efficient cooling system. Motors and generators are often equipped with a means for cooling formed of a cooling jacket provided with grooves or passages built into the motor/generator housing. Circulating oil or water, or even air through the grooves or passages provides cooling to the motors and generators.

It is common practice in machining applications to machine spiral grooves into a metal part. Machined spiral grooves in a housing have been shown to work well to remove the necessary heat from these components, however machined spiral grooves are expensive to cut in a production environment. Further, casting a continuous spiral groove is not simple to achieve nor desirable due to the negative relief caused by the pitch of the spiral, unless parted on several planes, which is a major disadvantage. The several parted planes force the use of multiple parting lines which means more complicated casting procedures and much higher manufacturing costs.

In a United States patent application to Burjes et al. (2007/0268464 A1), a method of making a motor/generator cooling jacket is disclosed. A hollow cylindrical housing is cast with an outer peripheral surface and an annular axially facing end surface, a plurality of grooves formed in the outer peripheral surface and a radial lip at one end. The Burjes et al. patent application also teaches inlet and outlet ports drilled through the end surface to communicate with the grooves, and sealing recesses and O-ring seals integrated for sealing. However, the prior art process does not provide a simple yet effective and efficient method of manufacture.

Specifically, the Burjes et al. application may require separate cores for the cooling jacket in the housing. Separate cores would increase the casting and other manufacturing costs. Further, the Burjes invention teaches a non-continuous flow path, which may require the cooling fluid to make 180-degree turns and flow in opposite directions. This non-continuous circulation path may lead to inconsistent and inefficient means for equally cooling the stator, and may lead to a less efficient system potentially causing a higher than desired pressure drop across the entire path of the fluid.

SUMMARY

The present disclosure, in one form, provides an electric motor/generator cooling mechanism including a hollow cooling jacket having an inner and outer coaxial surface, where the inner surface defines a generally cylindric cavity for receiving a stator in heat transference contact with the inner surface, and the outer surface has a cast spiral groove section with jogged cooling passages. The disclosure includes an outer case having one or more inlet ports, an outlet port, and a vent for purging air, cooling fluid flowingly encased between the cooling jacket and the outer case, flowing through the jogged cooling passages, and a flanged end surface on an end of the outer case for boltingly connecting the cooling jacket to the outer case.

In another aspect, a cooling jacket for a rotary electric device includes a jacket body having a first axial end, a second axial end and a mounting flange located adjacent the first axial end for coupling the jacket body with an outer housing. The jacket body further includes a longitudinal center axis and has an inner cylindrical surface which defines a cavity centered about the longitudinal center axis, and an outer surface. The inner cylindrical surface extends from the first axial end to the second axial end and includes an inner heat transference surface, and the outer surface includes an outer heat transference surface. The jacket body further includes a set of circumferential grooves formed in the outer surface and each adapted to transition a cooling fluid in contact with the outer heat transference surface in a circumferential direction, and a set of axially advancing grooves formed in the outer surface and each adapted to transition the cooling fluid in an axially advancing direction between adjacent ones of the circumferential grooves.

In still another aspect, a stator assembly for a rotary electric device includes a cooling jacket with a jacket body having a first axial end, a second axial end and a longitudinal center axis. The jacket body further has an inner cylindrical surface which defines a cavity, the inner cylindrical surface including an inner heat transference surface, and the jacket body also having an outer surface which includes an outer heat transference surface. The jacket body further includes a set of circumferential grooves formed in the outer surface and each adapted to transition a cooling fluid in contact with the outer heat transference surface in a circumferential direction, and a set of axially advancing grooves formed in the outer surface and each adapted to transition the cooling fluid in an axially advancing direction between adjacent ones of the circumferential grooves. The stator assembly further includes a stator positioned within the cavity and in heat transference contact with the inner heat transference surface.

In still another aspect, a method of assembling an electrical power subsystem for an electrical propulsion system includes placing a cooling jacket for a rotary electric device of the electrical power subsystem within an outer housing, the cooling jacket including a first axial end and a second axial end, a longitudinal center axis and defining a cavity for receipt of the rotary electric device. The method further includes establishing a cooling fluid passage between an outer surface of the cooling jacket and an inner surface of the outer housing at least in part by contacting a grooved segment of the outer surface with the inner surface of the outer housing, and fluidly connecting each of an inlet port formed in the outer housing and an outlet port formed in the outer housing with the cooling fluid passage.

Other novel features of the present disclosure will be in part apparent and in part pointed out hereinafter.

DETAILED DESCRIPTION

The present disclosure provides an apparatus for cooling an electric drive motor or generator that overcomes the limitations of the prior art. In the detailed description that follows, like numerals are used to denote like elements appearing in one or more of the drawings, except where otherwise indicated.

Figure 1:
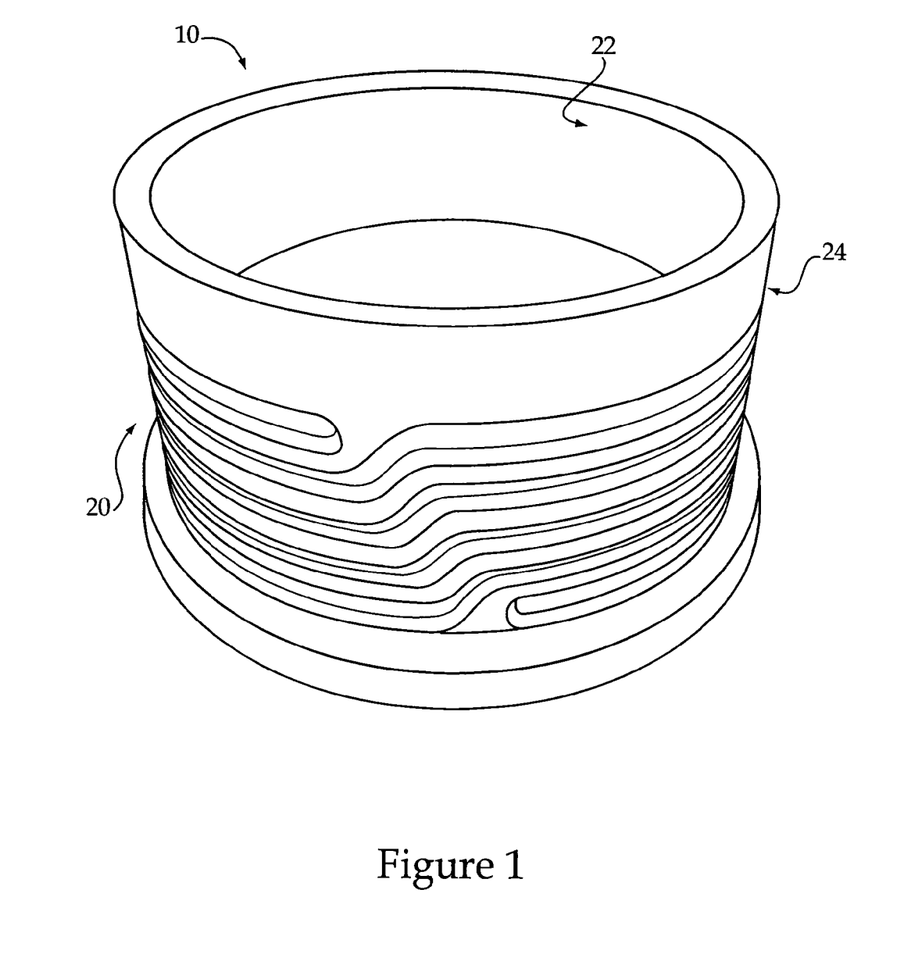
FIG. 1 is a perspective view of an exemplary embodiment of a cast groove cooling jacket of the present disclosure.

FIG. 1 is an illustrative view of an embodiment of the present disclosure. The electric motor/generator cooling mechanism 10 is comprised of a hollow cooling jacket 20, an outer case 30, cooling fluid, sealing o-rings, the case 30 having one or more inlet ports 32, an outlet port 34, and a vent for purging air 36. (The last four numbered elements are not shown in this view, but rather in FIG. 3, and will be discussed in detail later).

The cooling jacket 20 of the present disclosure has inner and outer coaxial surfaces 22 and 24, respectively. The inner surface 22 defines a generally cylindric cavity for receiving a stator, for example. FIG. 1 depicts the jacket 20 as a circular cylinder, although it should be appreciated that multiple geometries of jacket housings are contemplated within the scope of the present disclosure.

The cooling jacket 20 of the present disclosure is fabricated through a casting process. Within the context of this disclosure, cast should be understood to mean any manufacturing process by which a molten material such as metal or plastic is introduced into a mold, allowed to solidify within the mold, and then ejected or broken out to make a fabricated part. Casting is used for making parts of complex shape that would be difficult or uneconomical to make by other methods, such as cutting from solid material. Types of casting known in the art include sand casting, die casting, permanent mold casting, centrifugal casting, continuous casting, and the like.

Figure 2:
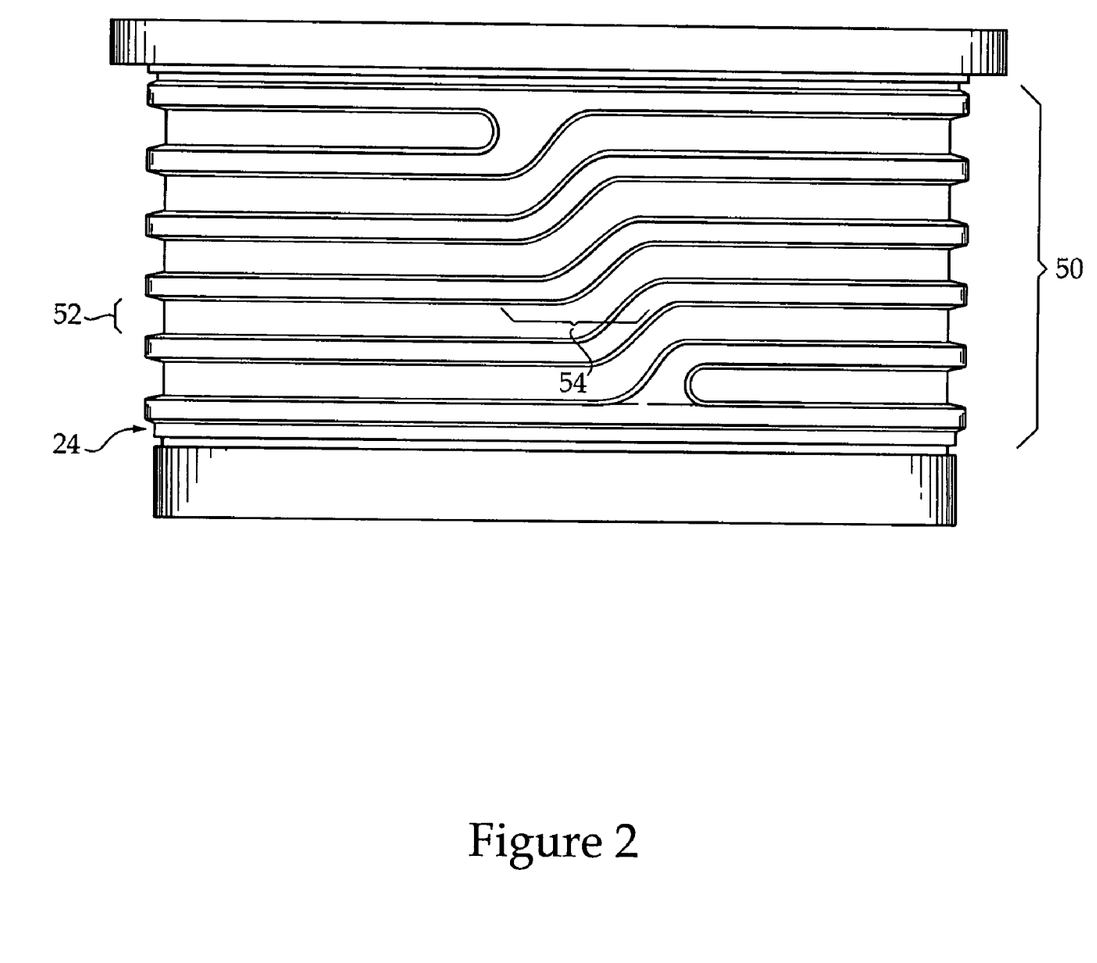
FIG. 2 is a side view of an exemplary embodiment of a cast groove cooling jacket of the present disclosure.

Turning now to FIG. 2, the cooling jacket 20 of the present disclosure consists of a cast spiral groove section 50 on the outer surface 24 that circulates fluid through the channel (not shown) that is created/contained by the outer case. The cooling jacket spiral groove section 50 further consists of a number of cooling passages or channels 52 that "jog" or "step" over (as shown in area indicated at 54) to allow for as many jogged cooling passages 52 as will fit into the design and size of the part.

The cast spiral groove section 50 is much more cost effective than a machined spiral groove section. The entire cooling groove section 50 is designed to optimize the cooling performance of the coolant. In other words, the individual jogged cooling passage 52 area and length can be designed to allow the coolant to extract the ideal amount of heat from the hot stator. A longer cooling groove path, will allow the coolant more time in contact with the cooling jacket. A shorter path means the coolant will spend less time against the cooling jacket. Similarly, you can adjust the coolant fluid velocity by adjusting the area of the cast jogged cooling passage 52. These features allow correctly designed fluid dynamics for the particular cooling system.

Further, the cooling path 50 of the present disclosure circulates the fluid in a continuous direction and does not require the fluid to make any 180 degree turns (i.e., the fluid is not required to reverse travel flow direction and go back toward an opposite direction), which may keep pressure drop to a minimum. This continuous circulation of cooling fluid may further help to provide a consistent and efficient means of equally cooling the stator (as no interruptions to the cooling path 50 means equal cooling all around).

The cast jogged cooling passages 52 not only allow the fluid to circulate without interruptions, but also help in reducing costs. It is very expensive to machine a cooling jacket 20 with groove sections (even without the spiral grooves 50), and the time to machine is extremely long. Casting the grooves into the part eliminates the large amount of machining and associated time required, and still provides the advantageous continuous path. As discussed above, it is not possible to cast a desirable spiral groove with a single parting line, due to the negative relief issue. As is known, the mold is not separable from the part without multiple parting lines at each associated groove angle. However, the straight grooves of the current disclosure allow the jacket 20 to be cast, and the jogs 54 in the spiral groove section 50 of the jacket allow the formation of the continuous path, and enable casting the part in a casting set-up having a single parting plane.

The cast jogged cooling passages 52 allow a "shift" in the cooling path down the length of the jacket while simultaneously maintaining a continuous, uninterrupted path. Additionally, along with the abrasive cast surface, the cast jogs 54 help to create turbulence, which may increase cooling performance. Following casting, the cooling jacket outer surface may be machined into a smooth uniform diameter.

Figure 3:
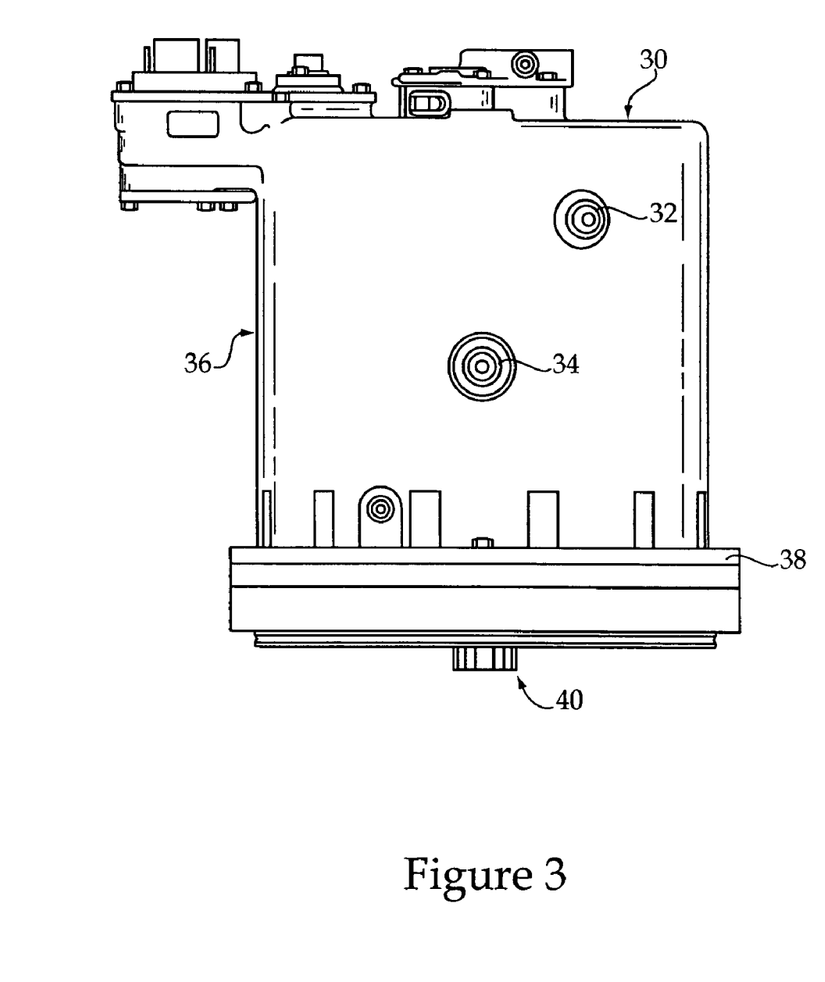
FIG. 3 is an illustrative side view of an exemplary rotary electric device having a cooling mechanism of the present disclosure.

As shown in FIG. 3, the jacket 20 is sealed with the outer case 30 to prevent the cooling fluid from escaping. The outer case includes a flange 32 on one of its two opposing ends for bolting, an inlet port 32, an outlet port 34, and a port for venting 36. A drive coupling 40 is also shown, which may be a power input in a generator embodiment or a power output in a motor embodiment. The cooling jacket 20 may slip into the outer case 30 until the last millimeters of travel of the jacket. Next, the jacket 20 may pilot into the outer case 30 for a slight press fit at the opposing ends of the case. The cooling groove area maintains a clearance fit (or slip fit tolerance) relative to the outer case 30, and the pilots are slight presses adjacent to the cooling groove o-rings, as would be understood in the art. Bolts may keep the outer case connected to the cooling jacket 20, and the bolts may provide for annular alignment and allow one way bolting. Optionally, a cooling jacket 10 may be cast into the outer case that the electric motor or generator stator presses into. The outer case may be comprised of a material with a relatively high thermal conductivity such as a metal. Advantageously, a metal outer case allows for effective heat transference.

In use, coolant flows through the one or more inlet ports 32 of the outer case 30 and is directed along the path previously described before exiting the jacket through the outlet port 34. Optionally, in one embodiment, there may be two inlets 32 located at the opposing ends of the outer case 30. One of the inlet ports 32 may be located at the flange 38 end of the outer case, and the other may be located at the non-flange end. The cooling fluid may simultaneously flow from one of the inlet ports 32 in a first radial direction and from the other inlet port 32 in a second radial direction to the center of the cooling groove area 50 and exit out of the outlet port 34. The outlet port may be located between two of the inlet ports 32. An arrangement of the inlet ports 32 and outlet ports 34 may be circumferentially advancing, and matched to a helical inclination of passages 54. In other words, passages 54 may be arranged on cooling jacket 20 in a manner defining a partial helix, having a helical inclination about a center axis of cooling jacket 20. Ports 34 and 32 may be arranged at circumferentially advanced positions relative to one another about outer case 30 such that they communicate with different ones of passages 54.

The vent for purging air may be located in the middle of the cooling grooves area 50, 180 degrees away from the outlet port 34. As the coolant flows along these paths, it contacts the stator housing or cooling jacket 20 and the outer case 30 and removes heat, thereby cooling the stator. The removal of heat is particularity efficient due to the aforementioned jogged cooling passages 52.

Figure 4:
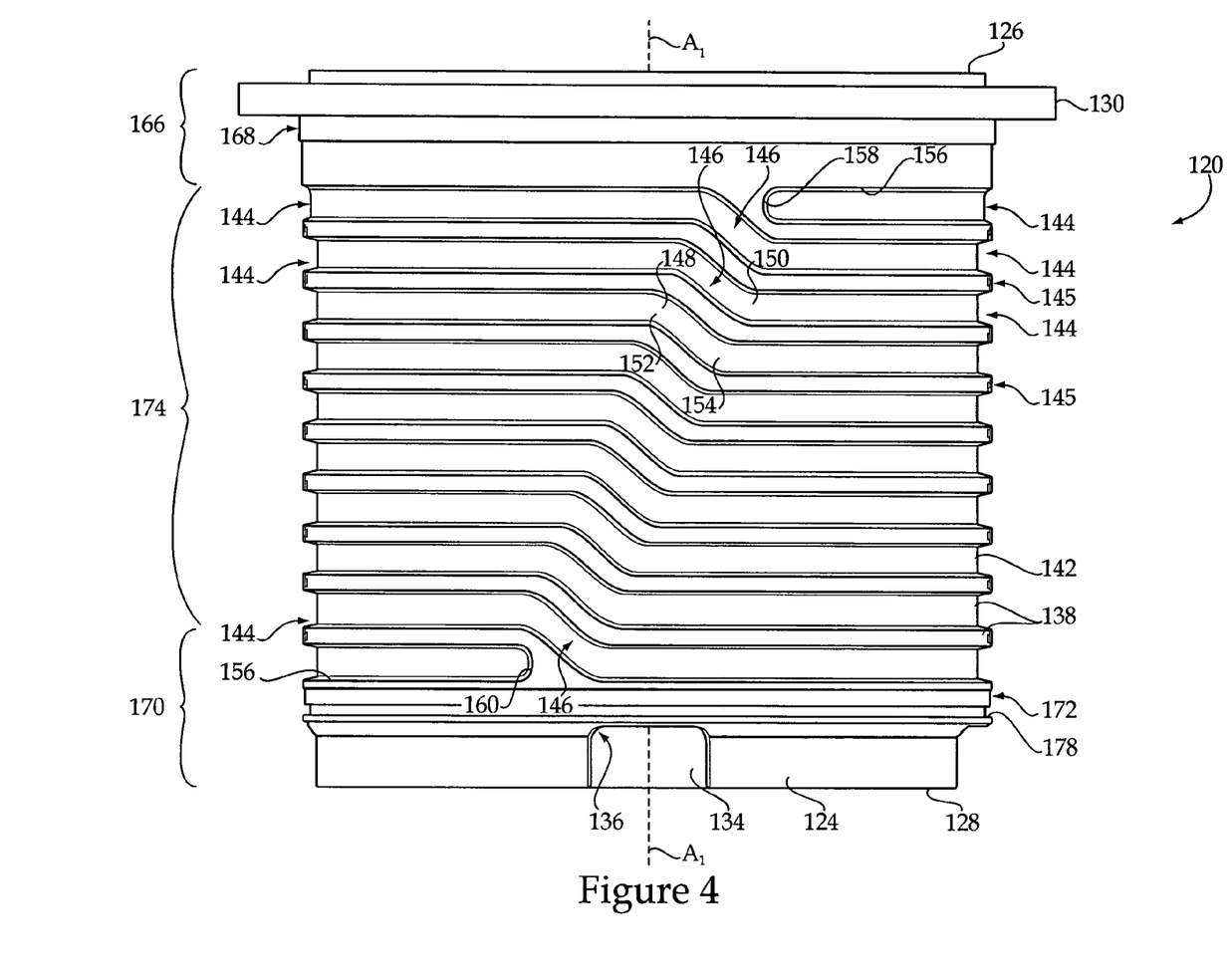
FIG. 4 is an illustrative side view of an exemplary cooling jacket according to one embodiment.
Figure 5:
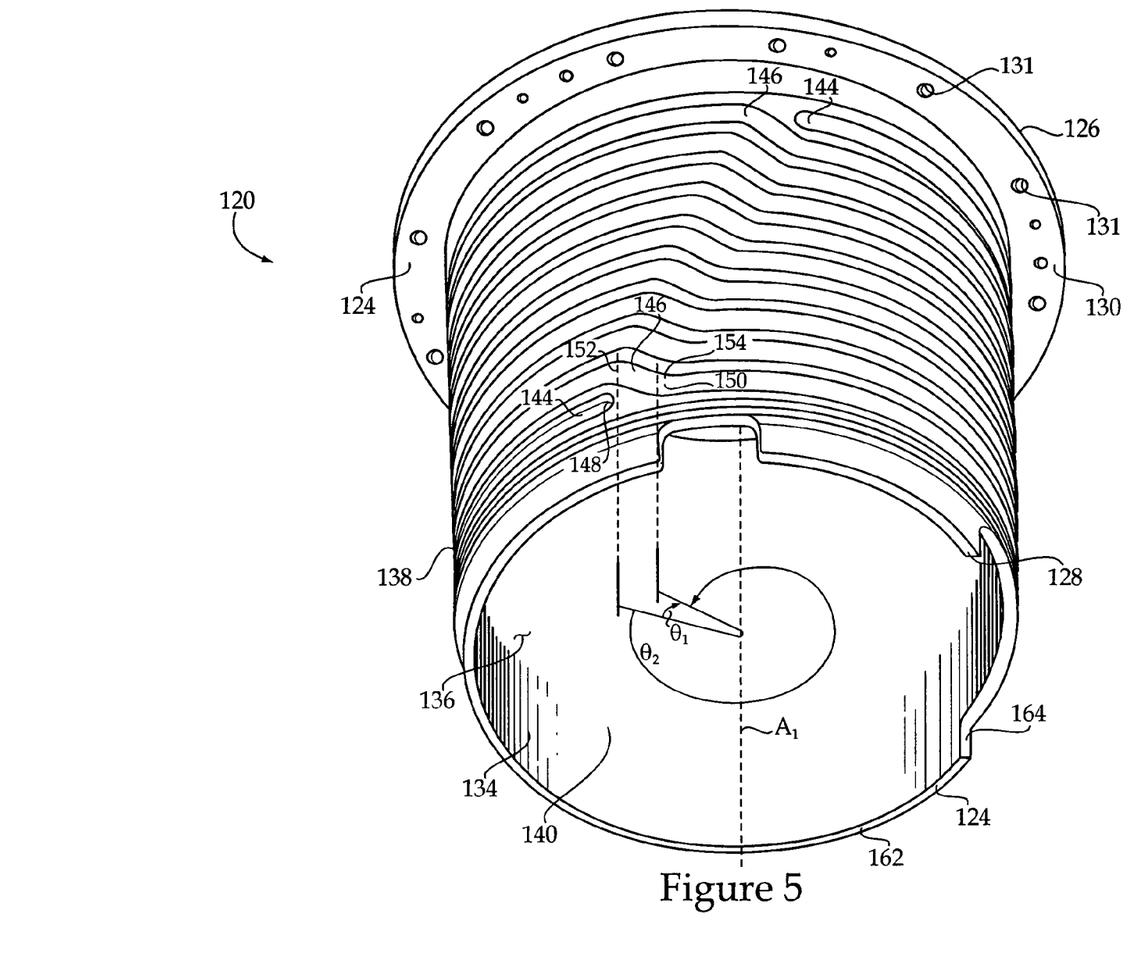
FIG. 5 is an isometric view of the cooling jacket of FIG. 4.

Referring to FIGS. 4 and 5, there is shown a cooling jacket 120 according to one embodiment. Cooling jacket 120 is similar to the cooling jackets/mechanisms already described herein, and further illustrates certain features. Cooling jacket 120 may include a jacket body 124 having a first axial end 126 and a second axial end 128. First axial end 126 may be a first terminal end and second axial end 128 may be a second terminal end. A mounting flange 130 may be located adjacent first axial end 126 which is configured for coupling jacket body 120 with an outer housing described hereinafter. Jacket body 124 may further include a longitudinal center axis $A_1$ and has an inner cylindrical surface 134 defining a cavity 136 centered about longitudinal axis $A_1$. Cavity 136 may extend from first axial end 126 to second axial end 128, and may be open at first axial end 126 and also open at second axial end 128. Cavity 136 may have a uniform diameter, and may be configured for receiving a stator or stator assembly in heat transference contact with inner surface 134. To this end, inner cylindrical surface 134 may include an inner heat transference surface 140. Jacket body 124 may further include an outer surface 138 having an outer heat transference surface 142. Jacket body 124 may be cast, similar to the embodiments described above, and may have cast features on outer surface 138 to facilitate the transfer and circulation of a cooling fluid, as will be further apparent from the following description.

Jacket body 124 may include a set of circumferential grooves 144 formed in outer surface 138 and each adapted to transition a cooling fluid in contact with outer heat transference surface 142 in a circumferential direction. Circumferential grooves 144 may be positioned adjacent one another along a jacket length of jacket body 124, the jacket length extending from first axial end 126 to second axial end 128. As used herein, the term "circumferential" should be understood to mean that grooves 144 extend generally about a circumference of jacket body 124, but need not extend completely around the circumference of jacket body 124. In a practical implementation strategy, as shown in FIG. 4, each of circumferential grooves 144 will be less than fully circumferential of jacket body 124, as further described herein. Circumferential grooves 144 may further be annular, and each disposed at a uniform axial position about longitudinal center axis $A_1$. In other words, grooves 144 may each define a segment of a circle, centered about axis $A_1$. In other embodiments, grooves 144 might be non-annular or they might deviate from a uniform axial position about longitudinal center axis $A_1$ or include sections which do so.

Jacket body 124 may further include a set of axially advancing grooves 146 formed in outer surface 138 and each adapted to transition cooling fluid in an axially advancing direction between adjacent ones of circumferential grooves 144. As used herein, the term "axially advancing" should be understood to mean that grooves 146 have a configuration and/or orientation such that cooling fluid flows in a direction that advances relative to longitudinal center axis $A_1$. Stated another way, axially advancing grooves 146 will not be positioned at a uniform axial location about longitudinal center axis $A_1$, but will instead be positioned such that they transition fluid toward or away from first axial end 126 or second axial end 128. This feature of axially advancing grooves 146 allows them to transition fluid from one of circumferential grooves 144 to an adjacent one of circumferential grooves 144. Axially advancing grooves 146 thus allow fluid to flow in heat transference contact with outer heat transference surface 142 in a progressively axially advancing direction along outer surface 138 as fluid passes between circumferential grooves 144. In one embodiment, axially advancing grooves 146 may extend diagonally between adjacent ones of circumferential grooves 144.

Each of circumferential grooves 144 may further include a first end 148 and a second end 150. Each groove 144 may further define a radial angle about longitudinal center axis $A_1$ between first end 148 and second end 150. Each of axially advancing grooves 146 may also include a first end 152 and a second end 154, and may also define a radial angle about longitudinal center axis $A_1$ between first end 152 and second end 154. In one embodiment, an average of the radial angles about longitudinal center axis $A_1$ defined by circumferential grooves 144 is larger than an average of the radial angles about longitudinal center axis $A_1$ defined by axially advancing grooves 146. In FIG. 5, a first angle $\theta_1$ is shown which corresponds with the radial angle about axis $A_1$ defined by each axially advancing groove 146. A second radial angle $\theta_2$ is shown corresponding to the radial angle about longitudinal axis $A_1$ defined by each circumferential groove 144. Other embodiments are contemplated, however, where axially advancing grooves 146 might define radial angles which, on the average, are larger than that which is shown. It may also be noted from the FIG. 5 illustration that axially advancing grooves 146 are arranged in a circumferentially advancing pattern. In other words, each axially advancing groove 144 may be disposed at a different circumferential position on jacket body 124 about longitudinal center axis $A_1$ as compared to the axially advancing grooves 146 to which they are adjacent. In a direction from axial end 126 towards axial end 128 it may be noted that axially advancing grooves 146 are positioned at progressively advanced circumferential positions. Each of circumferential grooves 144 may further include a length extending between the corresponding first end 148 and second end 150. In one embodiment, at least a majority of the lengths of circumferential grooves 144 are equal. Each of axially advancing grooves 146 may also include a length extending between the corresponding first end 152 and second end 154. A majority or all of the lengths of axially advancing grooves 146 may also be equal. It should be appreciated that the respective ends of each of the axially advancing grooves 146 and the circumferential grooves 144 may be co-terminous. First end 148 of a circumferential groove 144 will be a first end 152 of one of axially advancing grooves 146, whereas second end 150 of one of circumferential grooves 144 will be the same as a second end 154 of one of axially advancing grooves 146.

As discussed above, cooling fluid flow via cooling jackets, cooling mechanisms, etc., according to the present disclosure may take place in a continuous fluid flow path about the corresponding cooling jacket. In other words, cooling fluid may flow from an inlet location continuously, not interrupted and not reversing direction, to an outlet location. To this end, cooling jacket 120 may have a single fluid passage 156 with a first passage end 158 located adjacent first axial end 126 of jacket body 124, and a second passage end 160 located adjacent second axial end 128 of jacket body 124. Fluid passage 156 may have a uniform width. Each of ends 158 and 160 may be a blind end in one embodiment, and fluid passage 156 may define a cooling fluid flow path between first passage end 158 and second passage end 160. The cooling fluid flow path may be circumferential of jacket body 124 a plurality of times. In one embodiment, cooling fluid will be supplied simultaneously to fluid passage 156 at each of ends 158 and 160, and will be collected at a location between ends 158 and 160. In such an embodiment, fluid passage 156 may actually have fluid flowing in at two end locations and out at one or more middle locations. Fluid may thus flow in two directions within the same passage, converging at a discharge location, but will typically not reverse direction within the passage between the supply locations and the discharge location. Moreover, in this and other embodiments, fluid flow direction will typically change only relatively small amounts, corresponding for example to a relative angle between circumferential passages 144 and axially advancing passages 146. Avoiding sharp changes in flow direction has been shown to be associated with fewer eddies and the like, and thus relatively greater cooling efficacy.

FIG. 4 also illustrates a plurality of different segments of jacket body 124. In particular, a first end segment 166 is shown, and includes a first pilot press fit interface 168, further described herein. A second end segment 170 is also shown, and includes a second pilot press fit interface 172, also further described herein. A groove 178 may also be formed in outer surface 138 and configured to receive an O-ring for fluidly sealing between jacket body 124 and an outer housing. Jacket body 124 further includes a middle segment 174 extending between first end segment 166 and second end segment 170. Circumferential grooves 144 and axially advancing grooves 146 may be located in middle segment 174. Shown in FIG. 5 is a non-uniform terminal end surface 162 of jacket body 124. In one embodiment, terminal end surface 162 may define at least one cut-out 164 configured for passing connecting wires to or from a stator positioned within jacket body 124, or for connecting other pieces of hardware.

Figure 6:
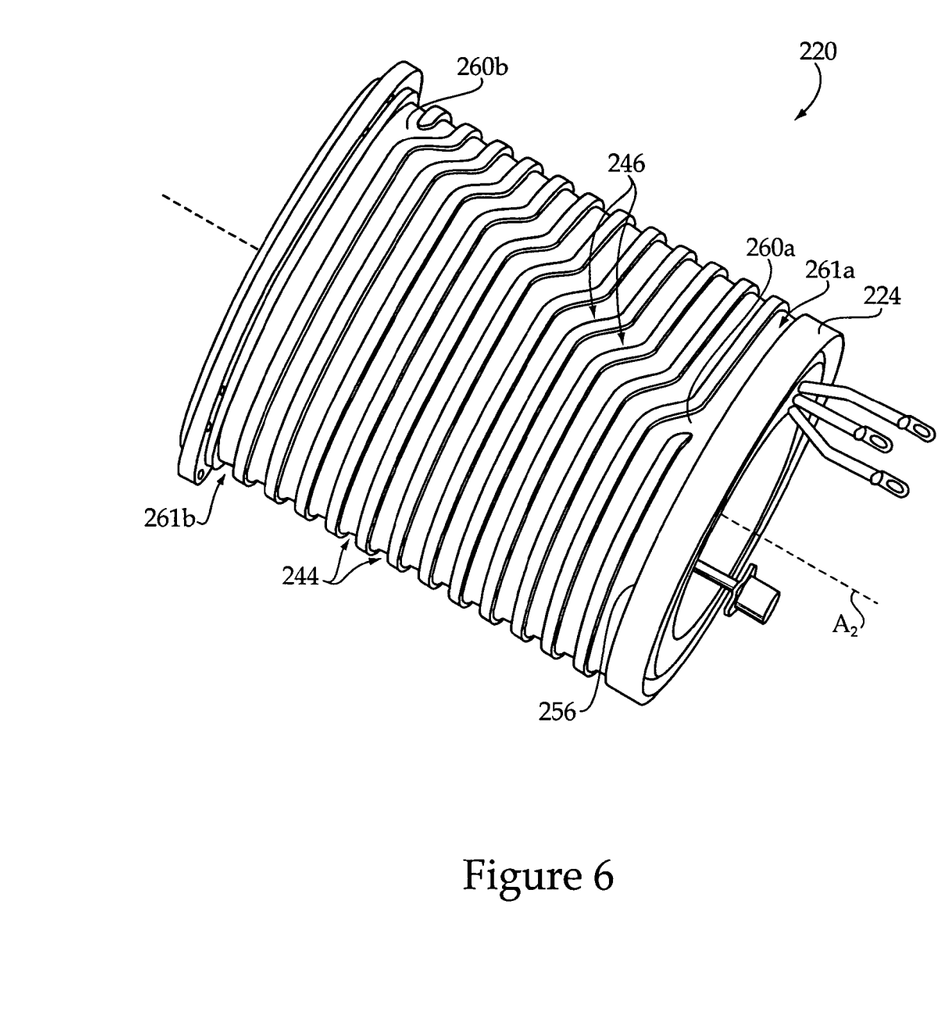
FIG. 6 is an isometric view of an exemplary cooling jacket according to another embodiment.

Turning to FIG. 6, there is shown a cooling jacket 220 according to another embodiment. In cooling jacket 220, a jacket body 224 includes a set of circumferential grooves 244 and a set of axially advancing grooves 246, configured similar to the circumferential and axially advancing grooves described in connection with the embodiment of FIGS. 4 and 5. Similar to jacket body 124 of FIGS. 4 and 5, jacket body 220 may include a single fluid passage 256 that includes each of circumferential passages 244 and axially advancing passages 246. Fluid passage 256 may include a first end 260a, and a second end 260b. Each of ends 260a and 260b of fluid passage 256 may connect with an annular end groove 261a and 261b, respectively, which is wholly circumferential of jacket body 224. In contrast to cooling jacket 120, in which passage 156 has blind ends 158 and 160, in cooling jacket 220 fluid passage 256 has open ends 260a and 260b, each connecting with annular end grooves 261a and 261b, respectively.

Figure 8:
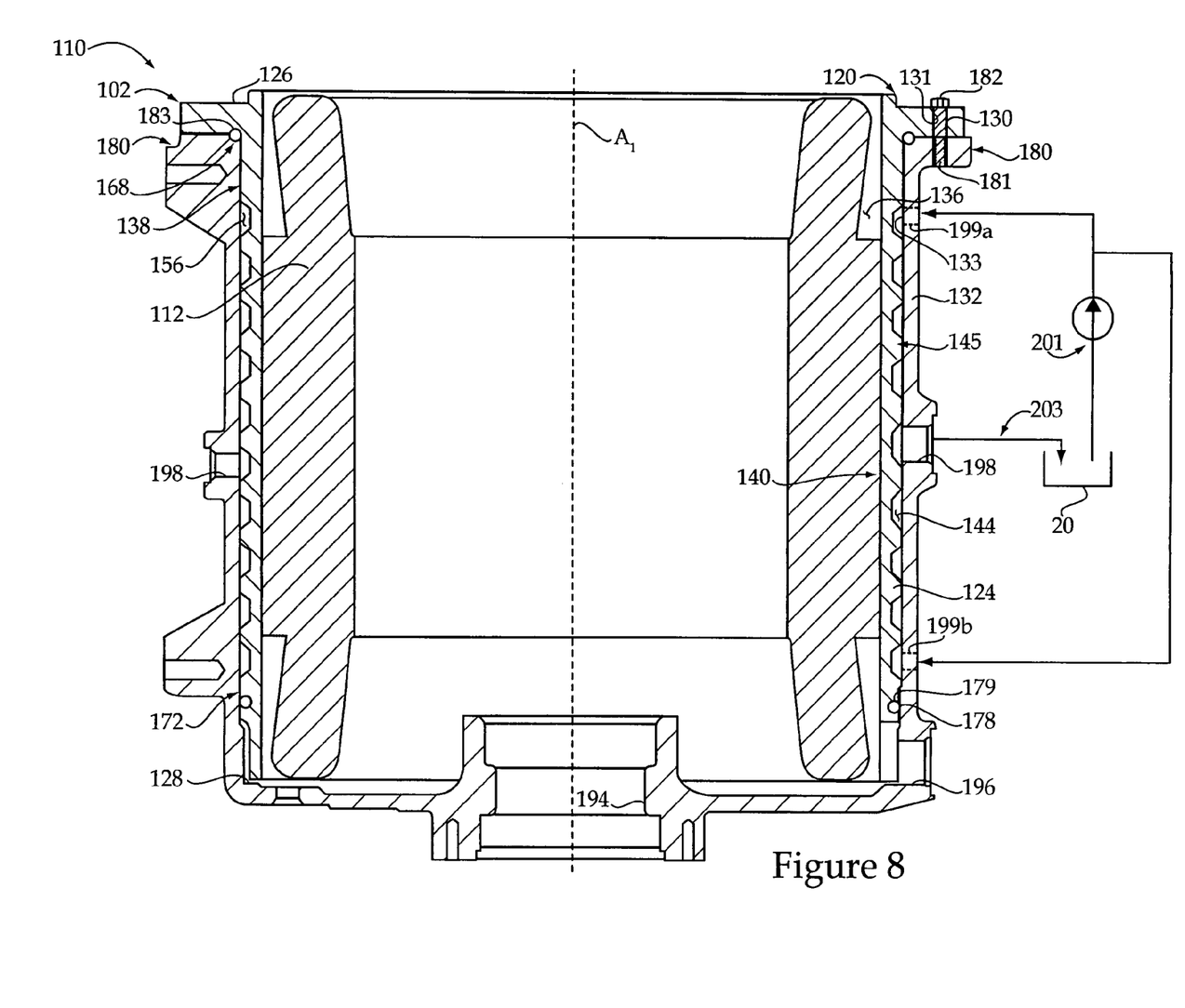
FIG. 8 is a sectioned side view of the electrical power subsystem of FIG. 7.

Referring also now to FIG. 8, there is shown cooling jacket 120 positioned within an outer housing 132. Outer housing 132 may include an inner surface 133 mated with and contacted by outer surface 138, to seal fluid passage 156. In particular, inner diameter 133 may substantially fluidly seal with one or more ribs 145 separating adjacent circumferential grooves 144 and axially advancing grooves 146. Also shown in FIG. 8 is a stator 112 received within cavity 136 and in heat transference contact with inner heat transference surface 140. Stator 112 and cooling jacket 120 together comprise a stator assembly 110. Stator assembly 110 is one example of an electrical power subsystem 102 contemplated herein. Outer housing 132 may also be considered a part of electrical power subsystem 102.

It may also be noted from the FIG. 8 illustration that flange 130 extends radially outward relative to axis $A_1$ and includes bolt holes 131 formed therein, one of which is shown. A bolt 182 is shown extending through bolt hole 131 and received within another threaded bolt hole 181 formed in a coupling element 180 of outer housing 132. Coupling element 180 might be a flange, lug or any other suitable feature appropriate for receiving bolt(s) 182 for attaching cooling jacket 120 with outer housing 132. Coupling element 180 might also be a clamping shoulder or the like.

Also shown in FIG. 8 is a vent 196 in outer housing 132 which may be used for venting air, oil, etc., from outer housing 132 and a set of ports each labeled 198 and extending through outer housing 132. As discussed above, cooling fluid may be passed into fluid passage 156 from supply locations corresponding with ends 158 and 160 of passage 156 and discharged at a middle, discharge location. One of ports 198 might be used for purging air, such as during filling passage 156 with cooling fluid. In FIG. 8, the middle, discharge location corresponds approximately with the rightmost of ports 198. A strategy might also be used where cooling fluid is supplied to one of ports 198, then discharged via discharge ports aligned with and in fluid communication with fluid passage 156 at ends 158 and 160. In another embodiment, cooling fluid might be supplied to a supply port aligned with and in fluid communication with fluid passage 156 at one of ends 158 and 160, and discharged via a discharge port aligned with and in fluid communication with fluid passage 156 at the other of ends 158 and 160. Ends 158 and 160 are off-plane and thus not shown in FIG. 8, and reference is made to FIGS. 4 and 5.

Casting the groove as the part is designed fits most cast processes that would already be used to make traditional prior art stator cooling jackets without the cast grooves. Therefore, no exotic tooling need be designed or created to cast the parts disclosed herein, and a larger pool of suppliers that may not have special machines that can turn a large spiral groove may be utilized. Returning to FIG. 4, cooling jacket 120 is shown approximately in an orientation it might have in a mold where a parting line of the mold lies in the plane of the page. In other words, a first mold half adapted to mold approximately one half of cooling jacket 120 would lie behind the plane of the page, whereas a second mold half adapted to mold approximately a second half of cooling jacket 120 would lie in front of the plane of the page. Axially advancing grooves 146 may, in such an embodiment, lie as far away as possible from the mold parting line. In FIG. 4, axially advancing grooves 146 are thus positioned an average of about 45° from the plane of the page, corresponding to the mold parting line. Variation from the present strategy is possible without departing from the scope of the present disclosure, however. Certain mold types may be amenable to casting pieces such as cooling jacket 120 with axially advancing grooves 146 positioned relatively closer to the mold parting line than in the illustrated embodiment. Where a two-piece casting mold is used, positioning axially advancing grooves 146 such that they are not intersected by the mold parting line is a practical implementation strategy.

INDUSTRIAL APPLICABILITY

Figure 7:
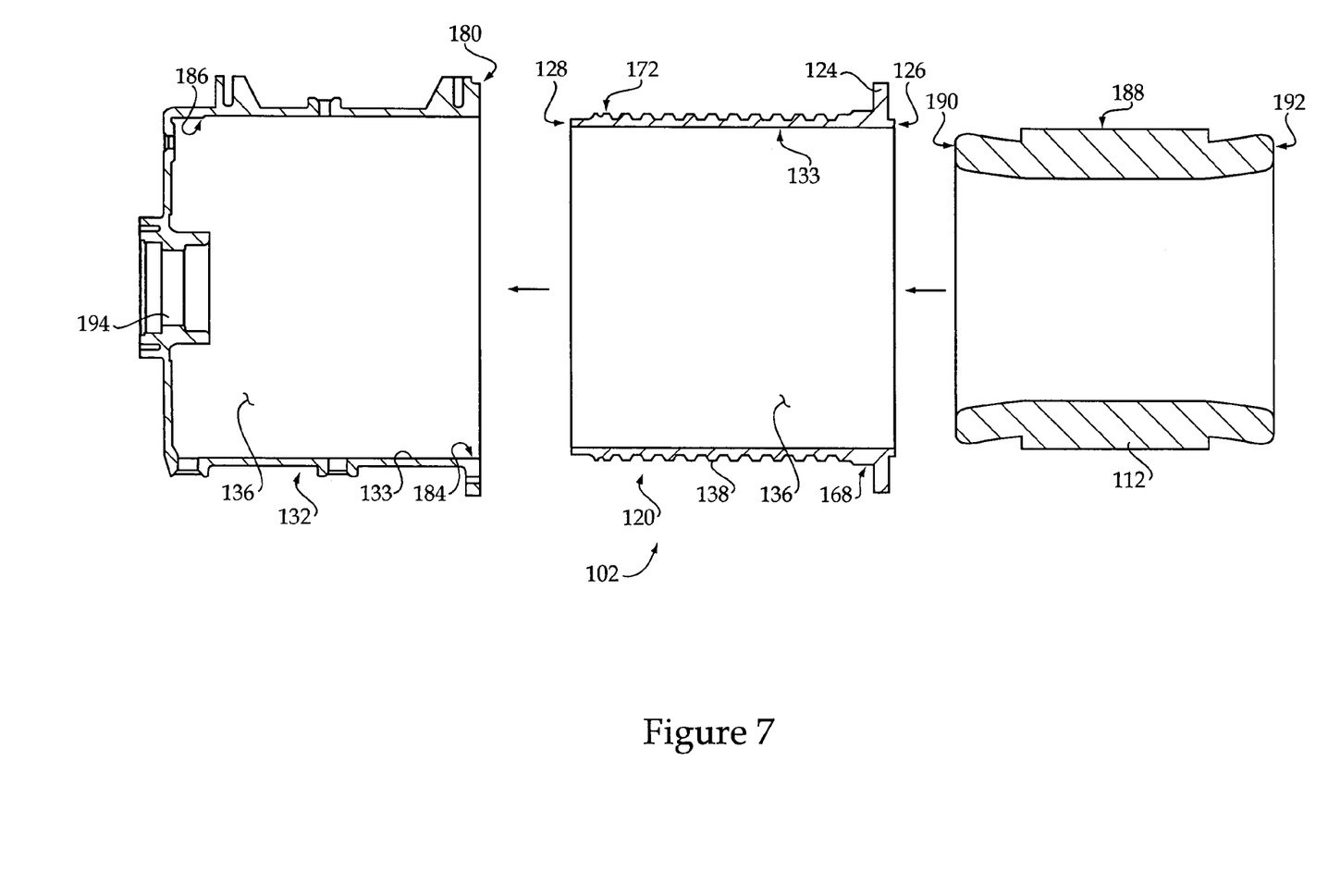
FIG. 7 is a sectioned side view of a disassembled electrical power subsystem according to one embodiment.

Referring also to FIG. 7, there is shown a disassembled view of the components shown assembled in FIG. 8, including stator 112, cooling jacket 120 and outer housing 132. As discussed above, cooling jacket 120 may be bolted to outer housing 132. Cooling jacket 120 may also be coupled with outer housing 132 via press fitting, in particular pilot press fits may be used between cooling jacket 120 and outer housing 132. To this end, first pilot press fit interface 168 may be located on outer surface 138 of jacket body 124 adjacent first axial end 126 and second pilot press fit interface 172 may be located on outer surface 138 of jacket body 124 adjacent second axial end 128. Outer housing 132 may also include a first pilot press fit interface 184 located on inner surface 133 and configured to interact with pilot press fit 168, and a second pilot press fit interface 186 also located on inner diameter 133 and configured to interact with pilot press fit interface 172. Pilot press fit interfaces 168, 172, 184 and 186 will typically be annular, and machined to tighter dimensional tolerances than other regions of surfaces 138 and 133.

During assembly of an electrical power subsystem according to the present disclosure, such as a subsystem 102 comprised of outer housing 132, cooling jacket 120 and stator 112, interaction between the respective pilot press fit interfaces can guide cooling jacket 120 relative to outer housing 132, enabling the parts to be readily arranged in a coaxial fashion, and contacting outer surface 138 with inner surface 133. Contacting outer surface 138 with inner surface 133 establishes fluid passage 156 and the corresponding fluid flow path for passing cooling fluid about cooling jacket 120. Appropriate orientations/alignment of supply and discharge ports with fluid passage 156 may take place by appropriately orienting cooling jacket 120 and outer housing 132 during guiding cooling jacket 120 into outer housing 132 via interaction between the respective pilot press fit interfaces 168, 172, 184 and 186.

In one practical implementation strategy, stator 112 may be located within cooling jacket 120 such that an outer surface 188 of stator 112 is in heat transference contact with inner surface 133. It may be desirable to place stator 112 in cooling jacket 120 prior to placing cooling jacket 120 within outer housing 132. In such an embodiment jacket body 124 may be expanded by heating, then stator 112 placed therein and jacket body 124 allowed to cool and thereby shrink about stator 112. In one embodiment, stator 112 may include a first axial end 192 and a second axial end 190, and may be retained within cooling jacket 120 such that first axial end 192 and second axial end 194 are substantially aligned with first axial end 126 and second axial end 128 of cooling jacket 120. Stator 112 may have an axial length between axial ends 192 and 190 which is equal to an axial length of cooling jacket 120 between its axial ends 126 and 128, as shown in FIG. 8. A cavity 136 defined by outer housing 132 may have an axial length approximately equal to the jacket length of jacket body 124, minus an axial thickness of flange 130.

Once stator 112 is positioned within cooling jacket 120, assembly of cooling jacket 120 with outer housing 132 may commence, guiding cooling jacket 120 into a desired position and orientation with regard to outer housing 132 via interaction of the pilot press interfaces described herein. One or more O-rings might be used to form seals between cooling jacket 120 and outer housing 132, such as a first O-ring 179 positioned in groove 178 and a second O-ring 183 positioned between cooling jacket 120 and outer housing 132 adjacent flange 130. Once properly positioned, cooling jacket 120 may be bolted to outer housing 132 in the manner described herein, or attached by another suitable means.

Following assembly of the components approximately to the state shown in FIG. 8, a suitable electrical generator rotor or motor rotor may then be positioned within stator 112, and an input coupling or output coupling, respectively, connected therewith. In one embodiment, an opening 194 may extend through outer housing 132. A drive coupling for connecting a generator rotor positioned in subsystem 102 with an internal combustion engine could extend through opening 194, or could extend through an opening in an end bell (not shown) coupled with an end of outer housing 132 opposite opening 194 or coupled with flange 130. Outer housing 132 may be configured at opening 194 to receive bearings and other mounting hardware for a generator rotor or stator rotor. In a version where electrical power subsystem 102 includes a motor system, opening 194 may be an opening for an output shaft coupled with a motor positioned therein. It will thus be appreciated that the components, features and assembly methods contemplated in the present disclosure will be amenable to both generator subsystems and motor subsystems for an electrical propulsion system. Electrical propulsion systems are contemplated having both a generator and also one or more electric propulsion motors cooled via separate cooling jackets in the manner described herein. One practical application of a motor system and/or generator system configured according to the present disclosure is in an electric drive system of an off-highway machine, such as a track-type tractor.

Cooling of a generator or motor housed within outer housing 132 may be made possible by fluidly connecting an inlet port 199a extending through outer housing 132 with a supply conduit 201 connecting with a cooling fluid reservoir 204 containing water, coolant, oil, etc. Fluid passage 156 is thus fluidly connected with reservoir 204 via inlet port 199. Another supply port 199b may also be fluidly connected with conduit 201. A drain conduit 203 may be fluidly connected with outlet port 198 to provide a fluid connection by way of outlet port 198 between fluid passage 156 and reservoir 204. It will be recalled that fluid supply ports may be provided at opposite end of fluid passage 156. In the FIG. 8 illustration, fluid supply ports 199a and 199b are off-plane, but may be arranged in a circumferentially advancing pattern matched to the pattern of axially advancing grooves 146, similar to mechanism 30 described above. It may be appreciated that supplying/discharging cooling fluid by way of ports extending through outer housing 132 allows an area of outer heat transference surface 142 to be relatively large, as the heat transference surface area need not be interrupted for fluid connecting mechanisms and the like. Thus, outer heat transference surface 142 may include the entire surface area of outer surface 138, in middle segment 174 thereof, having no voids or interruptions and thus enabling heat transfer to be optimized. The fluid supply/discharge configuration described herein also simplifies assembly and disassembly, as all of the fluid connections for cooling jacket 120 may be placed in a location accessible from outside housing 132.

The teachings of the present disclosure are contemplated to be applicable to the manufacturing of new electrical power subsystems and electrical propulsion systems, but are also applicable in the context of repair or remanufacturing. Those skilled in the art will be familiar with the relatively great care that is typically used in manufacturing stator assemblies for electrical generators and motors. It is common for a stator to include many windings supported on a stator frame or the like. Paper, insulation, resins or epoxies and other materials may be used in fashioning a stator or stator assembly which includes the windings. While the subparts of the example stator 112 are not described in detail herein, stator 112 will actually typically comprise a number of different components and materials. Despite taking care in manufacturing, stators can fail to perform as intended once made, for example, because of insulation failures, structural defects, etc. Certain defects might be apparent prior to assembling a stator such as stator 112 with a cooling jacket such as cooling jacket 120, however, in some instances performance issues may not become apparent until an electrical power subsystem or the like incorporating the stator has been at least partially assembled and tested. Stators used in the context of the present disclosure will typically have a service life at least as long as the electrical propulsion system, etc., of which they are a part. It is contemplated, however, that upon rebuild of the propulsion system or associated machine, upon detecting performance defects as mentioned above or in still other instances replacement of the stator may be desired. Replacement of the stator thus might be a preventative measure to ensure a full service life of a remanufactured propulsion system, as an upgrade to use new and improved components or to remedy some minor performance defect in an existing system.

The design and assembly methods disclosed herein, for example as described in connection with FIGS. 7 and 8, are contemplated to make repair or remanufacturing of a system incorporating cooling jacket 120, stator 112 and outer housing 132 relatively easier than repair or remanufacturing other known designs. As used herein, the terms "repair" and "remanufacturing" are used interchangeably, as in either case replacement of a stator whose use is no longer viable or desirable takes place. An end bell (not shown) which couples with outer housing 132 to enclose internal components and rotatably support one end of the motor or generator rotor, can be decoupled and the internal rotor and associated components removed. Fluid connections with ports 199*a*, 199*b* and 198, etc., may be readily disconnected, as no cooling fluid plumbing internal to cooling jacket 120 may be used in at least some embodiments. Stator 112 and cooling jacket 120 are then removed from outer housing 132, as a unit. Cooling jacket 120 and stator 112 are then placed in a furnace or the like or otherwise processed, to burn out the insulation, paper, etc., of stator 112. In many instances, initial placement of stator 112 in cooling jacket 120, such as via hot dropping or similar techniques, tends to make removal of stator 112 without damage impractical, hence, burning out of stator 112 is used, although the present disclosure is not thereby limited. Windings of stator 112 will typically remain, which can be readily removed from cooling jacket 120 and processed for scrap. If desired, cooling jacket 120 may then be cleaned and refurbished as necessary, and a replacement stator, for example similar or identical to stator 112, can then be assembled therewith in the manner described above in connection with FIGS. 7 and 8.

It will thus be appreciated that disassembly of cooling jacket 120 and stator 112 from outer housing 132 takes place by way of a minimal number of disassembly steps, requiring essentially only the removal of an end bell and internal components, and removing of bolts 182. The pilot press fits between jacket body 124 and outer housing 132 are readily overcome during disassembly. Moreover, the assembly comprised of stator 112 and cooling jacket 120 requires only minimal further processing to remove stator 112, salvage the windings, and prepare cooling jacket 120 for returning to service. This strategy differs from state of the art designs, such as Burjes et al. described above, requiring relatively labor intensive disassembly prior to the components' being rendered amenable to repair or remanufacturing. Further, since cooling jacket 120 and other cooling jackets contemplated herein do not attempt to integrate other functions such as structural support or mounting of other components, the tendency for wear or damage to limit service life or require extensive repairs is considered minimal and cooling jacket 120 may be reused many times.

It will still further be appreciated that the electric motor/generator cooling mechanism described herein can be used for cooling jackets for the motors and generators of any applicable system requiring a closed cooling environment, and where air cooling is not sufficient. While the present disclosure has been described in conjunction with a specific embodiment of an electric machine, it is understood that many alternatives, modifications and variations will be apparent to those skilled in the art in light of the foregoing description.

For example, the cooling jacket could be modified to have different numbers and arrangement of grooves, fins and walls to provide for different flow paths through the jacket, or could have more or less parallel sections than the number of sections shown. Further, the inlet and outlet points could be varied to vary the number of flow paths. The particular arrangement used for a given application will depend on size, heat transfer requirements, and possibly other factors. Accordingly, the disclosure is intended to embrace all such alternatives, modifications and variations, which fall within the spirit and scope of the appended claims.

We claim:

1. A cooling jacket for a rotary electric device comprising:
a jacket body having a first axial end, a second axial end and a mounting flange located adjacent the first axial end for coupling the jacket body with an outer housing, the jacket body further including a longitudinal center axis and having an inner cylindrical surface which defines a cavity centered about the longitudinal center axis, and an outer surface, the inner cylindrical surface extending from the first axial end to the second axial end and including an inner heat transference surface and the outer surface including an outer heat transference surface;
the jacket body further including a set of circumferential annular grooves formed in the outer surface and each adapted to transition a cooling fluid in contact with the outer heat transference surface in a circumferential direction, and a set of axially advancing grooves formed in the outer surface and each adapted to transition the cooling fluid in an axially advancing direction between adjacent ones of the circumferential grooves, such that the cooling fluid follows a flow path which is circumferential of the cooling jacket a plurality of times when passed between an inlet and an outlet formed in an outer housing for the cooling jacket.

2. The cooling jacket of claim 1 wherein the jacket body includes a jacket length extending from the first axial end to the second axial end, and wherein the circumferential grooves are disposed adjacent one another along the jacket length.

3. The cooling jacket of claim 1 wherein the mounting flange extends radially outward relative to the longitudinal center axis.

4. A cooling jacket for a rotary electric device comprising:
a jacket body having a first axial end, a second axial end and a mounting flange located adjacent the first axial end for coupling the jacket body with an outer housing, the jacket body further including a longitudinal center axis and having an inner cylindrical surface which defines a cavity centered about the longitudinal center axis, and an outer surface, the inner cylindrical surface extending from the first axial end to the second axial end and including an inner heat transference surface and the outer surface including an outer heat transference surface;

the jacket body further including a set of circumferential grooves formed in the outer surface and each adapted to transition a cooling fluid in contact with the outer heat transference surface in a circumferential direction, and a set of axially advancing grooves formed in the outer surface and each adapted to transition the cooling fluid in an axially advancing direction between adjacent ones of the circumferential grooves;

wherein the jacket body includes a jacket length extending from the first axial end to the second axial end, and wherein the circumferential grooves are disposed adjacent one another along the jacket length; and wherein each of the circumferential grooves includes an annular groove disposed at a uniform axial position about the longitudinal center axis, and wherein each of the axially advancing grooves extends diagonally between adjacent ones of the circumferential grooves.

5. The cooling jacket of claim 4 wherein:

each of the circumferential grooves includes a first end and a second end and defines a radial angle about the longitudinal center axis between the first and second ends of the corresponding circumferential groove;

each of the axially advancing grooves also includes a first end and a second end and defines a radial angle about the longitudinal center axis between the first and second ends of the corresponding axially advancing groove; and an average of the radial angles defined by the circumferential grooves is larger than an average of the radial angles defined by the axially advancing grooves.

6. The cooling jacket of claim 5 wherein each of the circumferential grooves includes a length extending between the corresponding first end and second end, at least a majority of the lengths of the circumferential grooves being equal, and each of the axially advancing grooves also includes a length extending between the corresponding first end and second end, at least a majority of the lengths of the axially advancing grooves being equal.

7. A cooling jacket for a rotary electric device comprising:

a jacket body having a first axial end, a second axial end and a mounting flange located adjacent the first axial end for coupling the jacket body with an outer housing, the jacket body further including a longitudinal center axis and having an inner cylindrical surface which defines a cavity centered about the longitudinal center axis, and an outer surface, the inner cylindrical surface extending from the first axial end to the second axial end and including an inner heat transference surface and the outer surface including an outer heat transference surface;

the jacket body further including a set of circumferential grooves formed in the outer surface and each adapted to transition a cooling fluid in contact with the outer heat transference surface in a circumferential direction, and a set of axially advancing grooves formed in the outer surface and each adapted to transition the cooling fluid in an axially advancing direction between adjacent ones of the circumferential grooves wherein the jacket body includes a jacket length extending from the first axial end to the second axial end, and wherein the circumferential grooves are disposed adjacent one another along the jacket length; and wherein the axially advancing grooves are arranged adjacent to one another and in a circumferentially advancing pattern.

8. The cooling jacket of claim 7 wherein the outer surface defines a single fluid passage extending between the first axial end of the jacket body and the second axial end of the jacket body, the single fluid passage including each of the circumferential grooves and each of the axially advancing grooves and defining a cooling fluid flow path that passes circumferentially around the cooling jacket a plurality of times.

9. The cooling jacket of claim 8 wherein the single fluid passage includes a first passage end located adjacent the first axial end of the jacket body and a second passage end located adjacent the second axial end of the jacket body, each of the first passage end and the second passage end being a blind end.

10. A stator assembly for a rotary electric device comprising:

a cooling jacket including a jacket body having a first axial end, a second axial end and a longitudinal center axis, the jacket body further having an inner cylindrical surface which defines a cavity, the inner cylindrical surface including an inner heat transference surface, and an outer surface including an outer heat transference surface;

the jacket body further including a set of circumferential grooves formed in the outer surface and each adapted to transition a cooling fluid in contact with the outer heat transference surface in a circumferential direction, and a set of axially advancing grooves formed in the outer surface and each adapted to transition the cooling fluid in an axially advancing direction between adjacent ones of the circumferential grooves, such that the cooling fluid follows a flow path which is circumferential of the cooling jacket a plurality of times when passed between an inlet and an outlet formed in an outer housing for the cooling jacket; and a stator positioned within the cavity and in heat transference contact with the inner heat transference surface.

11. The stator assembly of claim 10 wherein the jacket body further includes a mounting flange located adjacent the first axial end which extends radially outward relative to the longitudinal center axis, and a non-uniform terminal end surface located at the second axial end which defines at least one cut-out region for passing connecting wires to or from the stator.

12. The stator assembly of claim 10 wherein the outer surface includes a first end segment including a first pilot press fit interface, a second end segment including a second pilot press fit interface and a middle segment extending between the first end segment and the second end segment, the set of circumferential grooves and the set of axially advancing grooves being located on the middle segment.

13. The stator assembly of claim 10 wherein:

at least a majority of the circumferential grooves have equal lengths about the outer surface and at least a majority of the axially advancing grooves also have equal lengths about the outer surface; and the axially advancing grooves are arranged adjacent one another in a circumferentially advancing pattern.

14. The stator assembly of claim 13 wherein the circumferential grooves are annular shaped and each disposed at a uniform axial position about the longitudinal center axis, and wherein each of the axially advancing grooves extends diagonally between adjacent ones of the circumferential grooves.

15. The stator assembly of claim 14 wherein the outer surface defines a single fluid passage having a uniform width and including each of the circumferential grooves and each of the axially advancing grooves, the single fluid passage defining a cooling fluid flow path that passes circumferentially about the cooling jacket a plurality of times.

* * * * *